March 29, 1966 D. F. WILLMANN 3,243,676
MOTOR DRIVEN AUTOMATIC STEPPING DRIVE FOR A ROTATABLE
SHAFT, INCLUDING MEANS FOR POSITIVELY LOCKING THE
SHAFT IN A SELECTED POSITION AND DYNAMIC BRAKING
FOR THE MOTOR
Filed June 3, 1963 3 Sheets-Sheet 1
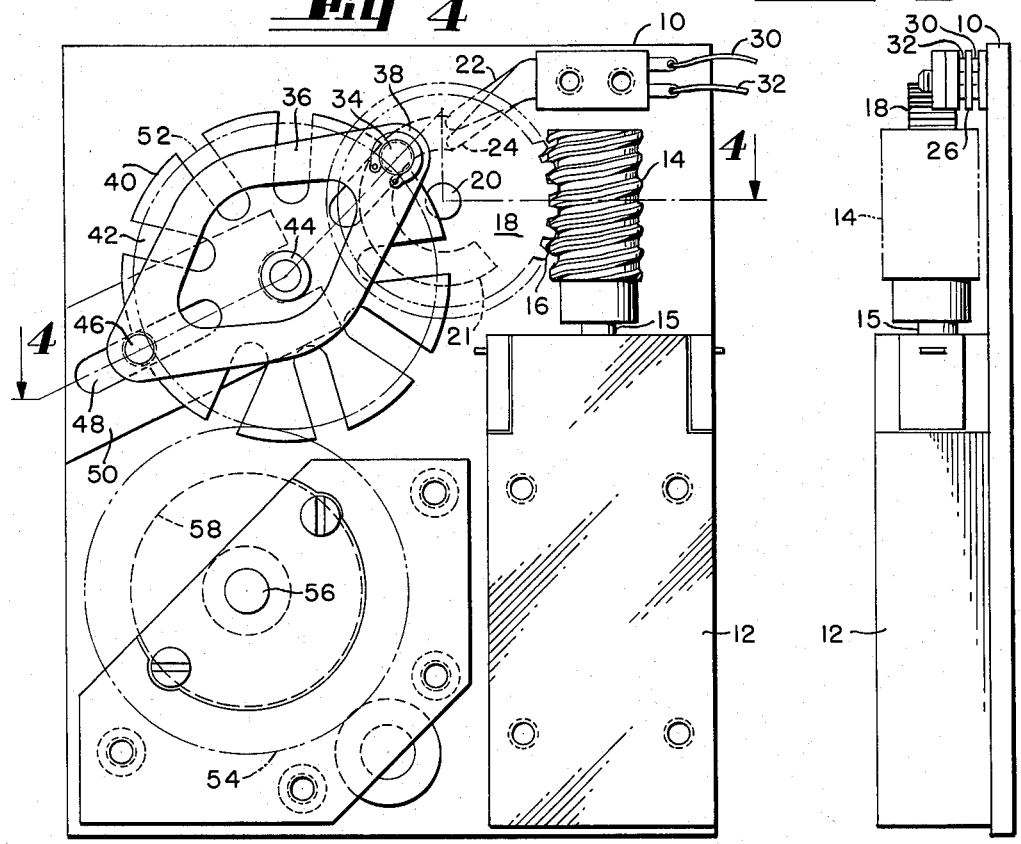
INVENTOR.
DONALD F. WILLMANN
BY
ATTORNEYS.

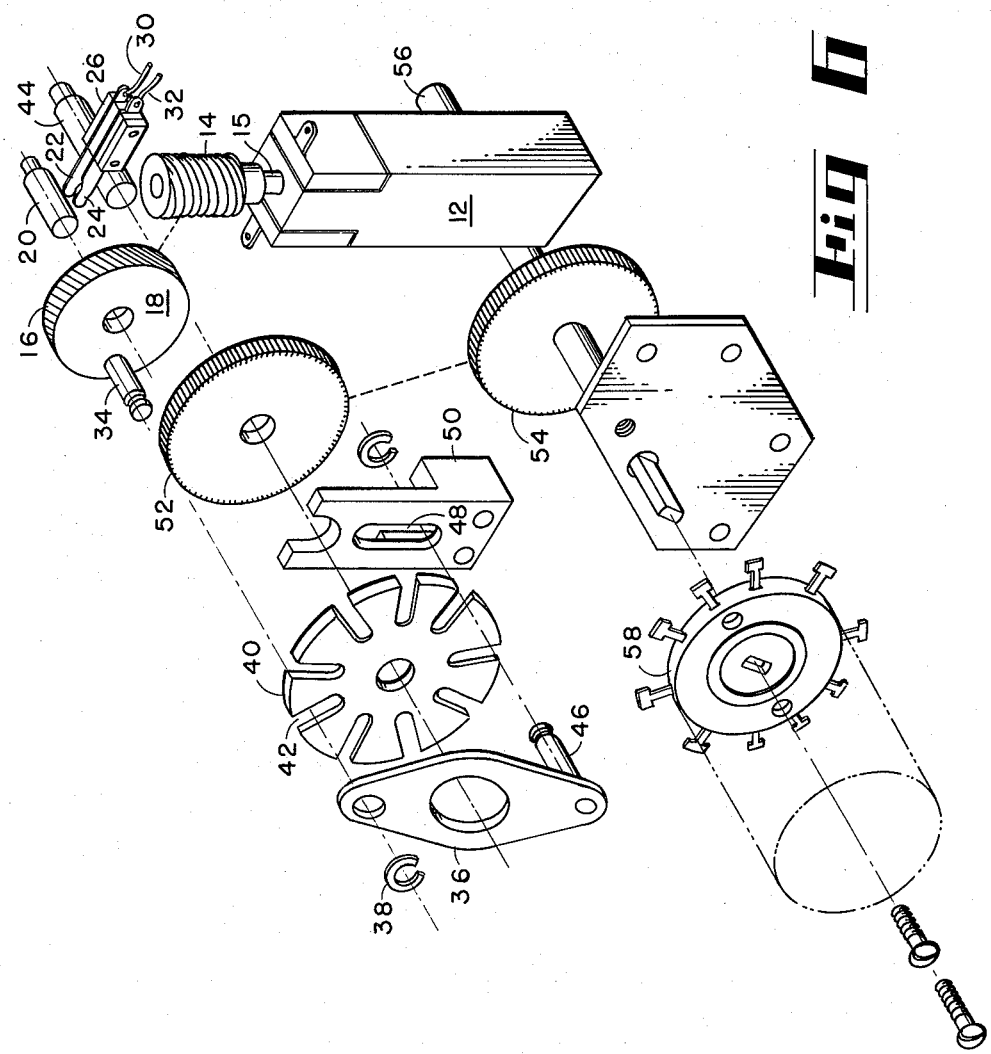

March 29, 1966  D. F. WILLMANN  3,243,676
MOTOR DRIVEN AUTOMATIC STEPPING DRIVE FOR A ROTATABLE
SHAFT, INCLUDING MEANS FOR POSITIVELY LOCKING THE
SHAFT IN A SELECTED POSITION AND DYNAMIC BRAKING
FOR THE MOTOR Filed June 3, 1963  3 Sheets-Sheet 3

INVENTOR.
DONALD F. WILLMANN
BY Alden D. Redfield
Irwin P. Garfinkle
ATTORNEYS.

3,243,676
MOTOR DRIVEN AUTOMATIC STEPPING DRIVE FOR A ROTATABLE SHAFT, INCLUDING MEANS FOR POSITIVELY LOCKING THE SHAFT IN A SELECTED POSITION AND DYNAMIC BRAKING FOR THE MOTOR
Donald F. Willmann, Cincinnati, Ohio, assignor to Avco Corporation, Cincinnati, Ohio, a corporation of Delaware
Filed June 3, 1963, Ser. No. 284,960
2 Claims. (Cl. 318—33)

This invention relates to a remotely controlled drive for precisely and automatically rotating a shaft step by step to a selected station, and for positively locking the shaft at said station. The invention finds utility for driving the shafts of devices such as the channel selector of a radio tuner and other step-type rotary switches.

The accurate positioning of step-type switches in selective tuning devices long has been a problem only partially solved by expensive means. The problem is more acute as the number of switch positions in 360 degrees rotation is increased, and many systems include manual means for correcting channel-stop errors. The present invention offers simple and inexpensive drive and control means for the accurate selection and positioning of stepped selector switches from a remote command station. Over and underrun errors are completely eliminated, and the mechanical and electrical characteristics of the apparatus prevent all tendencies towards simultaneously addressing two channels.

The invention comprises electromechanical means for the positive positioning of a step-type power drive, the selection on command of specific shaft positions, and the positive locking of the shaft in the selected position. The invention uses a motor-driven escapement which is always in positive control, whether in motion or stationary. The escapement, in the form of a cam-driven indexing wheel, controls the drive on command through associated electrical circuits and mechanically coupled switches.

The primary object of this invention is the achievement of high order accuracy in motor driven shaft settings in a uniform step drive.

Another object of this invention is to automatically drive a shaft step by step to a selected angular position, and to positively lock the shaft in said selected position.

Briefly described, the system functions to drive an output shaft, step by step, to any one of a plurality of selected angular positions, and to lock the shaft from rotation between intermediate steps and when the shaft is in the selected position. The output shaft is carried by an indexing wheel having a plurality of radial equally spaced indexing slots. A driving cam which carries a driving pin is positioned relative to the indexing wheel so that upon rotation of the cam, the pin enters one of the indexing slots, moving the wheel until the slot is tangent to the path of the pin, and then withdraws from the slot. A rocker arm pivoted from the driving pin its provided at its other end with a locking pin. The locking pin projects beyond the indexing wheel and reciprocates in a radial groove below the indexing wheel. The locking pin is so positioned that it radially enters a slot on the indexing wheel each time the driving pin withdraws from a slot.

The driving cam is driven by a D.C. motor, and is provided with a pair of brush contacts which are closed by the cam for a portion of each cycle of the cam immediately after withdrawal of the driving pin from a slot. The system also includes a null-seeking switch which, when the indexing wheel is in the proper position, serves to short-circuit the motor windings through the brush contacts on the cam to dynamically brake the motor, and simultaneously to disconnect the energizing source from the motor.

For further objects and for a better understanding of the details of the invention, reference should now be made to the following specification and drawings in which:

FIGURES 1–5 illustrate the mechanical construction of the drive;

FIGURE 6 is an exploded view of the major elements of FIGURES 1–5; and

Figure 7:
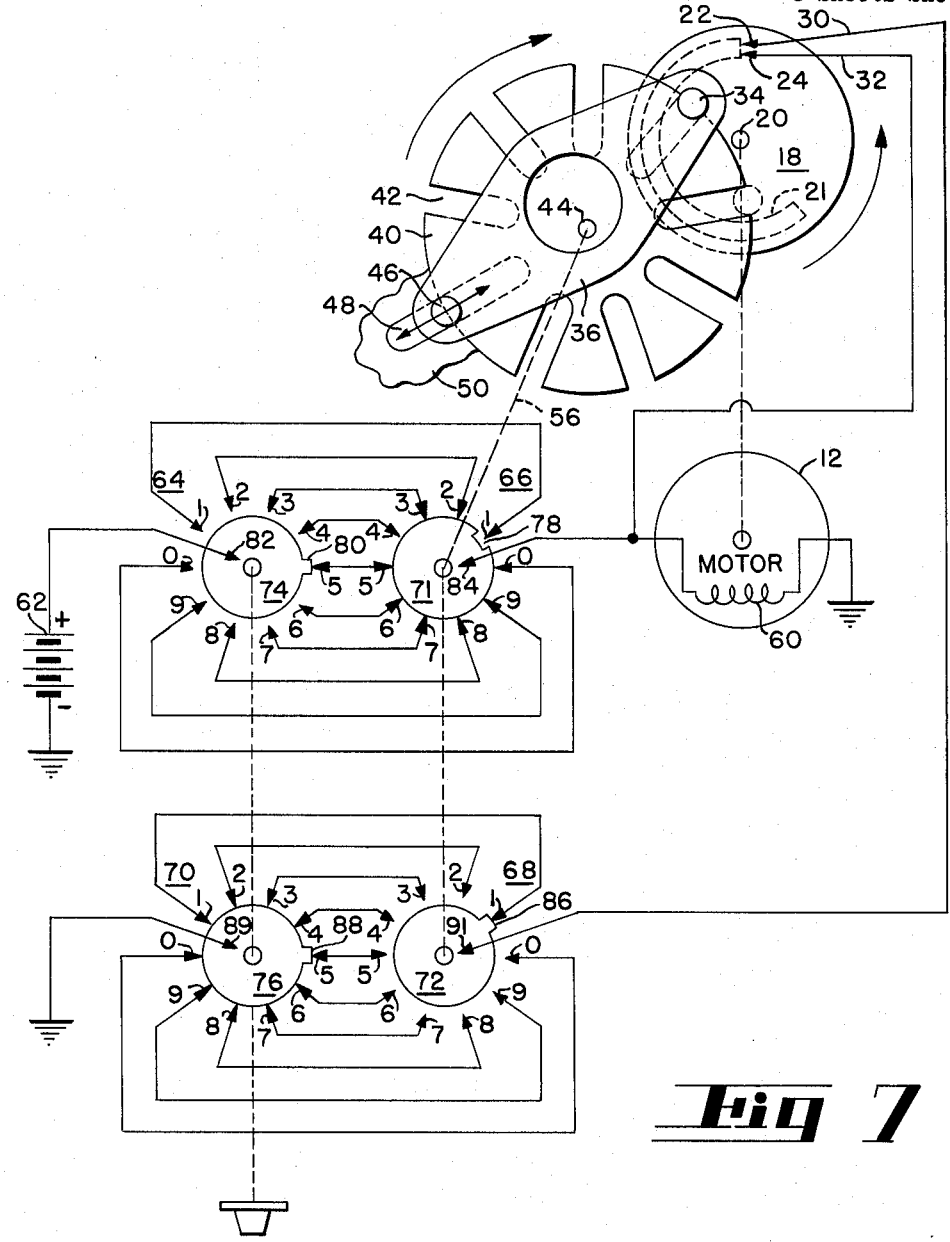
FIGURE 7 is a representation of the drive including the electrical switch circuits.

All of the elements of this invention, except the remotely located switches, are mounted on a supporting base plate 10. A small, permanent magnet D.C. motor 12, secured in any suitable manner to the supporting base plate 10, is provided with a worm 14 on its output shaft 15. When rotated by the motor 12, the worm 14 drives a worm gear 16 formed on the periphery of a driving cam 18 rotatably mounted on a shaft 20 supported from the base plate 10. The driving cam 18 is made of a non-conductive material, but one of its surfaces is provided with an arcuate groove filled with a conductive material 21. A pair of contact brushes 22, 24, insulated from one another by means of spacers 26 and secured to the base plate 10 by means of screws 28, are positioned to make continuous contact with the cam surface at the radius defined by the material 21. When both brushes contact the material 21, the leads 30 and 32 from the brushes 22 and 24, respectively, serve to short-circuit the windings of the D.C. motor 12 through a null-seeking switch (to be described) to dynamically brake the motor 12 at selected angular positions.

The driving cam 18 carries a driving pin 34 to which a rocker arm 36 is pivoted by means of a clip 38. A Geneva-type indexing wheel 40, having a plurality of radially disposed slots 42 spaced at equal angles around the entire periphery of the indexing wheel, is fixed on a rotatable output shaft 44 which is supported from the base plate 10. The indexing wheel 40 overlies the driving cam 18, and the driving pin 34 on the cam 18 is positioned on a radius on the cam 18 such that when the cam 18 is rotated it may enter a tangentially positioned slot 42 on the indexing wheel 40 and thereby drive the indexing wheel 40 until the pin 34 withdraws from the slot at the next occurrence of tangency.

The other end of the rocker arm is provided with a locking pin 46 which projects into a groove 48 of a locking pin guide 50 also secured to the base 10. The pin 46 is positioned on the rocker arm 36 so that it is at the periphery of the indexing wheel 40 when the driving pin 34 is just entering or withdrawing from a slot 42. The groove 48 extends radially with respect to both the indexing wheel 40 and the drive cam 18, and is approximately twice the length of the slots 42, approximately half of the groove being overlaid by the indexing wheel. Thus, as the driving cam 18 rotates continuously, the indexing wheel 40 is moved step by step by the driving pin 34, each step being an angle equal to the angular spacing between the slots 42. Simultaneously, the locking pin 46 on the other end of the rocker arm 36 reciprocates within the radially disposed groove 48, and therefore as the pin 34 withdraws from the slot 42, the pin 46 enters and moves radially within a slot with which it is aligned. The positioning of the locking pin in a slot maintains the indexing wheel in a fixed position until such time as the pin 34 is about to re-enter the next slot 42, at which time the pin 46 withdraws.

A gear 52 fixed to the output shaft 44 meshes with a gear 54 fixedly mounted on a rotatable shaft 56. The shaft 56 carries a plurality of fixedly mounted rotors of a bank of switches 58 in a null-seeking switch system.

The null-seeking switch system for energizing and for braking the motor 12 is shown in FIGURE 7. The motor 12 includes a winding 60 energized by means of a battery or other convenient source 62 through a first pair of null-seeking switches 64 and 66, respectively. When the null-seeking switches are in non-correspondence, the motor is energized and runs continuously. When in correspondence, the motor is de-energized. At the instant of de-energization, a short circuit connection is also completed across the motor winding 60 for braking the motor 12. The short-circuiting connection across winding 60 is made through the lead 32, brush 24, the conductive material 21 in the driving cam 18, the brush 22, lead 30, and a second pair of null-seeking switches 68 and 70 to ground. The rotors 71 and 72 of switches 66 and 68, respectively, are fixed to the shaft 56 for rotation therewith. The rotors 74 and 76 of switches 64 and 70, respectively, are ganged together, but these switches are remotely positioned from the remainder of the equipment.

In the example shown, each switch has 10 positions, and therefore each switch is provided with 10 stator contacts in positions from 0 to 9. In the construction of the switch 66 all of the stator contacts continuously brush the conductive rotor 71 except for that stator contact which is in the position opposite the indented area 78. On the other hand, in the remote switch 64 only that stator contact which is in the position opposite the projection 80 on the rotor 74 makes contact with the rotor 74. The battery 62 is connected to a brush 82 which makes continuous contact with the conductive rotor 74. The rotor 71 is continuously connected to the winding 60 through a conductive brush 84.

If the system has been at rest with the rotor 71 of switch 66 in the position shown, and the rotor 74 of switch 64 has been moved so that the projection 80 contacts stator contact 5, then a connection is made from the battery 62 through the rotor 74, the stator contact 5 of switches 64 and 66, the rotor 71, brush 84, and the motor winding 60. Therefore, the motor will run and will drive the rotors 71 and 72 (through the cam 18 and indexing wheel 40) until such time as the indented area 78 of the rotor 71 is opposite stator contact 5, at which time the circuit through the motor windings 60 is interrupted, and the motor 12 is de-energized.

Simultaneous with de-energization, the motor winding 60 is short circuited and the motor is dynamically braked to prevent coasting past a selected position. The switches 68 and 70, in conjunction with brushes 22 and 24, permit this function. The stators of switches 68 and 70 are identical to those of switches 64 and 66; however, in both instances the rotors 72 and 76 are provided with projections 86 and 88, respectively. The rotor 76 is connected to ground by means of a brush contact 89, while brush 91 connects the rotor 72 to the brush 22 at the cam 18. With the same operating conditions as before, the motor 12 runs until such time as the battery circuit is broken by the relative positioning of the switches 64 and 66 at the stator contacts 5. In the meantime the rotor 72 of switch 68 is also being rotated; however, the connection to ground through the brushes 22 and 24 is not completed until such time as two conditions occur. First, the projection 86 must make contact at a position corresponding to that manually set for the projection 88, and second, the brushes 22 and 24 must be contacting the material 21. This latter condition occurs once each revolution of the driving cam 18 immediately after the driving pin withdraws from a slot. Under the assumed circumstances, therefore, a short circuit will occur across the motor winding 60 when the projection 86 makes contact with stator contact 5 and when the brushes 22, 24 contact the material 21 immediately after withdrawal of the driving pin 34 from, and entry of the locking pin 46 into a slot 42.

While the particular gearing is not critical, in the system as actually reduced to practice the gearing between the motor 12 and the cam 18 was through a 40 to 1 gear reduction. Since 10-position switches were desired and since the indexing wheel may have only an odd number of slots 42, 9 slots were provided and a gearing ratio of 9 to 10 was used between the gears 52 and 54. Since the application of a short circuit across the motor winding 60 causes the motor to stop within no more than one revolution, and since there is a gear reduction of 40 to 1, the motor is effectively braked within a small fraction of a revolution of the cam 18 after the driving pin is withdrawn from a slot 42 in the null position. Slight coasting of the motor 12 and cam 18 has no effect since the indexing wheel is locked by the locking pin 46, and therefore rotation of the rotors 71 and 72 is prevented.

While in the illustrated embodiment the cam 18 is fabricated of insulating material with a cast-in shorting material 21 serving as a switch device for motor braking, the cam may be made of a metal conductor with an insulating material cast in. With this modification the brushes 22 and 24 would not be connected except when they were not in contact with the cast-in material 21.

Moreover, while a 9-position index controlling a 10-position switch is shown, it will be understood that other combinations may be used, depending only on gearing ratios. The number of switch positions may be increased to any number, limited only by the practical limitations of switch size and mechanical spacing.

Since it is clear that this invention is subject to many modifications and adaptations without departing from the spirit thereof, it is intended that the invention be limited only by the appended claims as interpreted in the light of the prior art.

What is claimed is:

1. In a system for rotatably driving an output shaft step by step to a selected station, the combination comprising:

an indexing wheel coaxially fixed on said shaft for rotation therewith, said indexing wheel having an odd-numbered plurality of equally spaced radial slots extending from the periphery of said wheel towards the center thereof;

a cam mounted for rotation on an axis parallel to the axis of said indexing wheel;

a drive pin projecting from said cam, said pin being spaced from the axis of said cam whereby said pin describes a circular path when said cam is rotated, said pin being positioned so as to enter a slot which is tangent to said path, drive said indexing wheel through a given angle and withdraw from said slot at the next tangency of said slot with respect to said path, said slots being spaced at said given angle;

a rocker arm pivotally connected at one end to said drive pin;

a locking pin projecting from the other end of said rocker arm;

a groove fixedly positioned radially with respect to said indexing wheel and said driving cam, said slots in said indexing wheel overlying approximately half of said groove when radially aligned, said locking pin projecting from said rocker arm past said indexing wheel and into said groove, whereby said locking pin is constrained from all motion except reciprocating radial motion, said locking pin being positioned with respect to said drive pin so that it withdraws radially from a slot when said driving pin is tangentially entering a slot, and whereby said locking pin radially enters a slot to lock said indexing wheel when said driving pin is tangentially withdrawing from the slot;

a direct current permanent magnet motor for driving said cam on its axis;

a source of direct currents;

a first switch system for energizingly connecting said source to said motor so that said output shaft is driven when not at said selected angular station, and for disconnecting said source from said motor when said output shaft is at said selected angular station; and a second switch system completing a dynamic braking circuit across said motor when said output shaft is at said selected station.

2. In a system for rotatably driving an output shaft step by step to a selected station, the combination comprising:

an indexing wheel coaxially fixed on said shaft for rotation therewith, said indexing wheel having an odd-numbered plurality of equally spaced radial slots extending from the periphery of said wheel towards the center thereof;

a cam mounted for rotation on an axis parallel to the axis of said indexing wheel;

a drive pin projecting from said cam, said pin being spaced from the axis of said cam whereby said pin describes a circular path when said cam is rotated, said pin being positioned so as to enter a slot which is tangent to said path, drive said indexing wheel through a given angle and withdraw from said slot at the next tangency of said slot with respect to said path, said slot being spaced at said given angle;

a rocker arm pivotally connected at one end to said drive pin;

a locking pin projecting from the other end of said rocker arm;

a groove fixedly positioned radially with respect to said indexing wheel and said driving cam, said slots in said indexing wheel overlying approximately half of said groove when radially aligned, said locking pin projecting from said rocker arm past said indexing wheel and into said groove, whereby said locking pin is constrained from all motion except reciprocating radial motion, said locking pin being positioned with respect to said drive pin so that it withdraws radially from a slot when said driving pin is tangentially entering a slot, and whereby said locking pin radially enters a slot to lock said indexing wheel when said driving pin is tangentially withdrawing from the slot;

a direct current permanent magnet motor for driving said cam on its axis, said motor having a motor winding;

a source of direct currents;

first null-seeking switch means for connecting said source to said motor winding for energizing said motor until said output shaft is driven to said selected station and for disconnecting said source from said motor winding when said shaft is at said station;

a pair of spaced conductive brushes fixedly positioned adjacent said driving cam, one of said brushes being connected to one side of said motor winding;

means on said cam for electrically connecting said brushes to one another each time said driving pin withdraws from a slot; and second null-seeking switch means connecting the other brush to the other side of said motor winding when said shaft is at said selected station.

References Cited by the Examiner

UNITED STATES PATENTS

| 2,200,728 | 5/1940 | Walker _____ 318—33 |
| 2,760,139 | 8/1956 | Luebking _____ 318—467 |
| 2,769,947 | 11/1956 | Elliott _____ 318—470 X |
| 2,884,581 | 4/1959 | Schunemann et al. __ 318—265 X |
| 2,934,688 | 4/1960 | Haerther et al. ____ 318—467 X |
| 3,017,557 | 1/1962 | Amato. |
| 3,070,736 | 12/1962 | Polley _____ 318—16 X |
| 3,136,966 | 6/1964 | Lindemann et al. ____ 318—467 |

ORIS L. RADER, *Primary Examiner.*

MILTON O. HIRSHFIELD, T. LYNCH,
*Assistant Examiners.*